(12) United States Patent
Van Den Berg

(10) Patent No.: US 10,899,375 B2
(45) Date of Patent: Jan. 26, 2021

(54) PALLET TRUCK

(71) Applicant: RAVAS EUROPE B.V., Zaltbommel (NL)

(72) Inventor: Niels Van Den Berg, Den Bosch (NL)

(73) Assignee: RAVAS EUROPE B. V., Zaltbommel (NL)

( * ) Notice: Subject to any disclaimer, the term of this patent is extended or adjusted under 35 U.S.C. 154(b) by 0 days.

(21) Appl. No.: 16/349,441

(22) PCT Filed: Nov. 7, 2017

(86) PCT No.: PCT/NL2017/050718
§ 371 (c)(1),
(2) Date: May 13, 2019

(87) PCT Pub. No.: WO2018/088895
PCT Pub. Date: May 17, 2018

(65) Prior Publication Data
US 2019/0270468 A1 Sep. 5, 2019

(30) Foreign Application Priority Data
Nov. 14, 2016 (NL) ..................................... 2017784

(51) Int. Cl.
*B62B 3/06* (2006.01)
(52) U.S. Cl.
CPC .............. *B62B 3/0606* (2013.01); *B62B 3/06* (2013.01); *B62B 3/0618* (2013.01); *B62B 2203/10* (2013.01); *B62B 2203/50* (2013.01)
(58) Field of Classification Search
CPC ...... B62B 3/06; B62B 3/0606; B62B 2203/50
See application file for complete search history.

(56) References Cited

U.S. PATENT DOCUMENTS 4,666,004 A * 5/1987 Raz ...................... G01G 19/083
177/139
5,417,536 A * 5/1995 Cech ................... G01G 19/083
177/140

(Continued)

FOREIGN PATENT DOCUMENTS

DE 202007012562 U1 1/2008
DE 202009016057 U1 3/2010

(Continued)

OTHER PUBLICATIONS

"International Search Report" dated Mar. 15, 2018 in PCT Application No. PCT/NL2017/050718, filed Nov. 7, 2017.

*Primary Examiner* — Brian L Swenson
(74) *Attorney, Agent, or Firm* — Perry + Currier Inc.

(57) ABSTRACT

A pallet truck comprises a rolling frame (10) and at least one force sensor (51, 52) for registering and generating as electronic output signal a loading of a load platform (20). The force sensor is coupled to electronic processing means for receiving and processing the output signal, and display means (65) are provided for generating a visual weight indication. At least a part of the processing means is accommodated together with a first electronic power supply in a first housing (50) forming part of the frame (10). The display means (65) are arranged together with a second electronic power supply in a second housing (60) on or close to a handle (45) of an operating arm. A wired first connection (56) is provided between the force sensor (51, 52) and the processing means. Telecommunication means are provided for establishing and maintaining a wireless second connection (57) between the first housing (50) and the second housing (60).

8 Claims, 1 Drawing Sheet

(56) References Cited

U.S. PATENT DOCUMENTS

Figure 1:
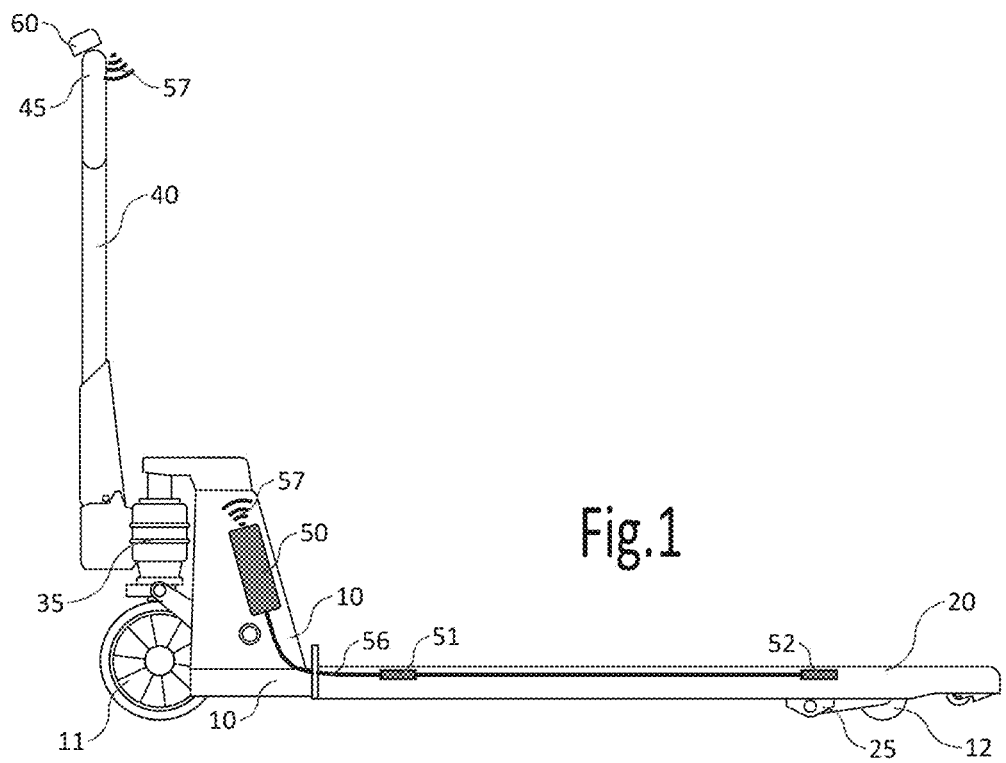

| | | | | |
|---|---|---|---|---|
| 5,739,478 | A * | 4/1998 | Zefira | G01G 19/083 |
| | | | | 177/130 |
| 8,579,304 | B2 * | 11/2013 | Setzer, Sr. | B66F 9/08 |
| | | | | 280/47.17 |
| 9,810,571 | B1 * | 11/2017 | Su | G01G 19/083 |
| 2008/0224433 | A1 | 9/2008 | Setzer et al. | |
| 2010/0187022 | A1 * | 7/2010 | Saigh | B65D 19/38 |
| | | | | 177/132 |
| 2013/0126806 | A1 * | 5/2013 | Van Seumeren | B62B 3/06 |
| | | | | 254/2 R |
| 2013/0127126 | A1 * | 5/2013 | Lantz | B62B 3/0612 |
| | | | | 280/43.12 |
| 2014/0266779 | A1 * | 9/2014 | Grothaus | H04W 4/70 |
| | | | | 340/870.02 |
| 2017/0233231 | A1 * | 8/2017 | Gariepy | B66F 9/0755 |
| | | | | 701/2 |
| 2018/0009643 | A1 * | 1/2018 | Hoffman | B62B 5/0069 |

FOREIGN PATENT DOCUMENTS

| | | |
|---|---|---|
| FR | 2639931 A1 | 6/1990 |
| FR | 2752298 A1 | 12/1996 |
| WO | 1998202024 A1 | 6/1982 |
| WO | 200103990 A1 | 1/2001 |

* cited by examiner

PALLET TRUCK

The present invention relates to a pallet truck comprising a rolling frame which comprises a load platform for receiving a cargo thereon and which is provided with a lifting device for adjusting the load platform to a cargo-receiving or releasing low position and a cargo-transporting high position, wherein the lifting device is coupled to an operating arm extending from the frame, which operating arm enables a user to manoeuvre with the pallet truck and to adjust the load platform between the low and high position with the lifting device, wherein the frame is provided with at least one force sensor for registering and generating as electronic output signal a loading of the load platform, wherein the at least one force sensor is coupled to electronic processing means for receiving and processing the output signal from the at least one force sensor, and wherein display means are provided for generating to the user a visual indication of a weight of the loading calculated by the processing means from the output signal of the at least one force sensor.

Such pallet trucks are applied on large scale as logistical means of transport for cargoes in warehouses and workplaces. Although the term pallet truck would suggest otherwise, it is not only a pallet with a cargo thereon which is transported therewith since a pallet truck can also be utilized for non-palletized cargo. The load platform is brought into the low position by means of the operating arm and moved in this position below a cargo for displacing which may or may not be carried by a pallet, and the platform is then brought into the high position with the operating arm, wherein the cargo is lifted from the ground. In this situation the cargo can be moved from a one location to another. Manpower is normally used for this purpose, although in some cases the pallet truck is provided with a drive and the displacement is supported by an (electric) motor provided for this purpose on the pallet truck.

There is a need in practice during maneuvering with the pallet truck to have an indication of a weight of the cargo on the load platform. A pallet truck of the type stated in the preamble according to the European patent EP 1200298 of applicant has for this purpose at least one force sensor arranged close to the load platform such that a loading of the load platform is thereby registered and a value is generated therefrom in the form of an electronically processable signal to processing means such as a microprocessor. A weight of the loading corresponding to the signal of the force sensor is hereby determined therefrom on the basis of a tailored algorithm and generated as information to the display means which provide a visual indication thereof to the user. In this known pallet track both the force sensor and the processing means are provided together with an electric power supply and the display means in or under a compact shared housing which is mounted as complete unit on the frame.

Although the known pallet truck hereby provides an exceptionally practical and economic arrangement, which can optionally be retrofitted, for the purpose of providing weight information, it has the drawback that the weight indication and operation of the unit are provided on the frame and not at or close to eye level. From an ergonomic perspective this is not always ideal. The placing of the elevated unit with the display means on the frame moreover makes the known pallet truck relatively vulnerable and costly.

The present invention has for its object, among others, to provide a pallet truck with further means providing the user with an indication of a loading of the load platform in a more practical manner.

In order to achieve the stated object a pallet truck of the type stated in the preamble has the feature according to the invention that at least a part of the processing means is accommodated in a first housing forming part of the frame, that the display means are provided in a second housing arranged spatially separated from the first housing and on or close to a handle of the operating arm, that a first connection is provided between the at least one force sensor and the processing means over which the output signal is generated, and a second connection is provided between the first housing and the second housing over which the output signal is generated in optionally at least partially processed form.

Registration of the loading of the load platform thus takes place on or in the frame, while a visual indication thereof is generated closer to eye level via the display means which are provided for this purpose in a separate second housing mounted on or close to the handle of the operating arm. The first housing is advantageously accommodated at a protected location in the frame and need be less regularly accessible for operation, service or maintenance. The first housing can in particular be arranged concealed inside the frame, whereby this part of the device is less susceptible to damage and is well protected against impact. Furthermore, possible control buttons or a touch-sensitive screen can thus be provided in, on or at the second housing. These are therefore within easy reach, or at least considerably closer to hand, for the user. Operation is hereby significantly quicker and more ergonomic. Because the display means are present closer to the eyes of the user, they can moreover be given a smaller form without detracting from readability. The second housing can hereby be more compact, and as a result is also less vulnerable and costly.

A preferred embodiment of the pallet truck has the feature according to the invention that the first connection comprises a wired cable connection, that the second connection comprises a wireless telecommunication connection and that telecommunication means are provided for establishing and maintaining the wireless second connection between the first housing and the second housing over which the output signal is generated in optionally at least partially processed form. Because the first connection takes a wired form and the processing means are accommodated wholly or partially in the second housing, a power consumption of the part of the electronics provided on the frame can be limited so as to increase an operating time of an optional power supply in the first housing. The second housing is on the other hand readily accessible by the user so that a power take-off of the components accommodated therein, which can draw from a separate second power supply in the second housing, can be implemented in practical manner in the form of a rechargeable or replaceable battery. Although the second connection can likewise take a wired form per se, this preferred embodiment has the advantage that, due to the absence of intermediate cabling, the operating arm with the second housing thereon can be easily detached from the frame and carried separately. This results in more compact transport dimensions and hereby results in a reduction in distribution costs.

In order to limit regular service and maintenance of the first housing to a minimum, a preferred embodiment of the pallet truck according to the invention has the feature that at least one of the first housing and the second housing comprises an electric power supply in the form of a rechargeable battery and that the frame is provided with conversion means for extracting kinetic energy from the frame and recovering electrical energy therefrom which is supplied to the rechargeable battery.

The said housing is hereby at least wholly self-sufficient in the sense that energy consumption of the electronic components received therein or coupled thereto is at least partially recovered from kinetic energy generation from the frame. In a first particular embodiment the pallet truck according to the invention is characterized here in that the kinetic energy is extracted from a manipulation of the operating arm, while in a second particular embodiment the pallet truck according to the invention is characterized for this purpose in that the kinetic energy is extracted from a rolling movement of the frame.

Ambient light, in particular daylight, can be used as energy source for the processing means instead of the kinetic energy of the frame. In a particular embodiment the pallet truck according to the invention is characterized for this purpose in that at least one of the first housing and the second housing comprises an electric power supply in the form of a rechargeable battery and that conversion means are provided here for recovering electrical energy from ambient light which is supplied to the rechargeable battery.

The wireless connection can be embodied per se in diverse ways, wherein use can optionally be made of a tailored, unique protocol and signal for data transfer. From an economic perspective however, a further embodiment of the pallet truck according to the invention has the feature that the telecommunication means comprise a transmitter-receiver assembly on the basis of a standard protocol for wireless data transfer, in particular on the basis of Bluetooth. Use can thus be made of electronic components and control software commercially available on large scale from diverse suppliers at relatively low cost price.

With a view to a high measure of precision of the weight indication generated to the user, a further preferred embodiment of the pallet truck according to the invention has the feature that the load platform comprises a lift fork with a set of lifting tines, wherein at least one force sensor is accommodated between the frame and each of the lifting tines of the lift fork for the purpose of registering and generating as electronic output signal a loading of the associated lifting tine. It has been found that, through such a placing of a number of force sensors more or less directly between the lifting tines which bear the cargo and the other underlying part of the frame, a likewise relatively direct force sensing, and thereby exceptionally accurate weight indication, can be obtained.

Figure 2:
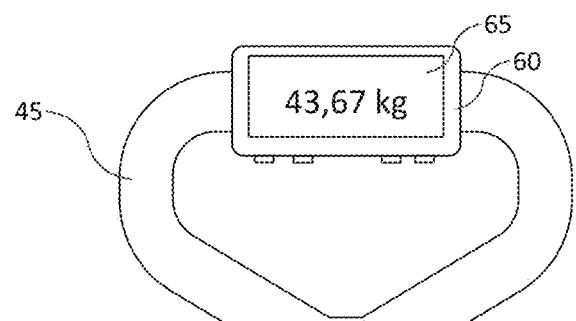

The invention will be further elucidated hereinbelow on the basis of an exemplary embodiment and an accompanying drawing. In the drawing:

FIG. 1 shows a longitudinal section of an exemplary embodiment of a pallet truck according to the invention; and FIG. 2 shows a detail view of the operating arm with handle of the pallet truck of FIG. 1.

The figures are otherwise purely schematic and not always drawn to scale. Some dimensions in particular may be exaggerated to greater or lesser extent for the sake of clarity. Corresponding parts are designated in the figures with the same reference numeral.

The pallet truck shown in FIG. 1 comprises a mobile frame 10 from which extends a height-adjustable load platform which in this embodiment comprises a lift fork with a set of lifting tines 25, one of which is shown in side view. Frame 10 supports with a set of freely rotating wheels 11, 12 on a ground surface and is thus rollable. Both the frame and the lift fork are manufactured from a robust material, such as optionally preserved or stainless (sheet) steel. Lifting tines 20 are coupled here via pivot arms 25 and drive rods (not further shown) to a lifting device, and are thereby adjustable between the shown low position and a transport position raised relative hereto. This mechanism is assumed sufficiently known to a person with ordinary skill in the art and therefore not further elucidated here.

The lifting device comprises a hydraulic cylinder 35 to which an operating arm 40 is coupled. Using the operating arm the hydraulic cylinder 35 can be pressurized by performing a reciprocal pivoting movement therewith, usually referred to as pumping. Load platform 20 is hereby raised, while the platform is lowered by opening a valve of cylinder 35 with a control member (not shown) on operating arm 40, whereby an overpressure prevailing therein can escape and load platform 20 drops back to the shown position.

In the shown position lifting tines 20 can be moved under or into a pallet or other cargo, or removed therefrom. By raising the lifting tines in the above indicated manner the cargo can be lifted from the ground surface and then moved. In order to obtain an indication of a loading of the load platform in this latter situation, a set of force sensors 51,52 are mounted between each of the lifting tines and the frame. These are so-called load cells which are able and configured to register a load exerted on the associated lifting tine and to generate this as a corresponding electronic signal.

The output signals from the individual force sensors 51,52 are corrected and totalized by processing means, and a weight of the cargo on the load platform is determined therefrom with great accuracy to within less than one kilogram per thousand kilograms. This weight information is generated visually to the user by means of an image display device 65. Force sensors 51,52 are coupled over a wired first connection 56 to at least a part of the processing means that is accommodated in a first housing 50 in the frame. This housing 50 also comprises an electronic power supply in the form of a rechargeable battery. Image display device 65 is on the other hand provided by a spatially separated second housing 60 arranged on or close to a handle 45 of the operating arm. Also provided thereon are a number of control buttons 63 with which different operational functions of the device can be selected and/or set.

First housing 50 and second housing 60 are coupled electronically to each other. A wired connection can likewise be provided therebetween for this purpose, although use can optionally also be made, as here, of wireless communication. In this embodiment the first and second housing are both provided for this purpose with transmitter and receiver means for establishing and maintaining a wireless connection 57 therebetween. In this example use is made for this purpose of a Bluetooth connection, although another optionally standardized protocol for wireless data transfer can optionally also be selected for the purpose. The Bluetooth chosen here is a so-called open source protocol for which diverse components are freely available commercially.

The weight information, or the raw data from force sensors 51,52, is exchanged with second housing 60 over this connection so as to be further processed in the second housing. Second housing 60 has an electronic power supply (not shown), such as for instance also a rechargeable battery, for powering the display device and the further electronics therein. The processing means with which an accurate weight indication is calculated from the output signals of force sensors 51,52 are advantageously wholly accommodated in the first housing. Possible calibration data and other configuration settings are hereby stored within the first housing, and the second housing need provide little more than a display and operation functionality. In the case of breakage or other malfunction of the second housing it can thus be easily replaced by a standard component without such settings being lost.

With a view to an extended operating time of the rechargeable battery in first housing 50, a provision is made in the frame to convert kinetic energy to electrical energy. The battery is supplied with the thus recovered electrical energy so as to compensate for the power generation to the electronics in second housing 60. This relates for instance to an induction loop or coil in combination with permanent magnetic means in wheels 11,12 of the frame or similar converting means between operating arm 40 and frame 10 for the purpose of recovering electricity from the above described pumping action. The power source in the first housing will thus have a relatively long operating time, in particular in the same order of magnitude as its service life. The first housing can therefore be concealed without problem in invisible and protected manner in the frame.

Second housing 60 with the image display means does not require a wired connection to the frame and can therefore be mounted in particularly practical manner. Housing 60 here particularly comprises two parts which together bound a cavity which is open on both sides and in which a tubular part of handle 45 is clampingly received. The parts of housing 60 are both provided with attaching means with which the two parts are mutually connected while clamping round the associated part of the handle. The second housing can thus be arranged without invasive intervention in the construction of the pallet truck, and an angular adjustment of the second housing can moreover be realized in particularly practical manner.

Although the invention has been further elucidated above with reference to only a single exemplary embodiment, it will be apparent that the invention is by no means limited thereto. On the contrary, many variations and embodiments are still possible within the scope of the invention for a person with ordinary skill in the art. The second housing can thus be advantageously equipped with one or more photovoltaic cells as primary power source or for the purpose of recharging a rechargeable battery present therein. In the case of a wired (second) connection between the first and second housings a separate power supply can optionally be dispensed with in one of the two housings and the power supply can be drawn from the other housing.

The invention claimed is:

1. Pallet truck comprising a rolling frame which comprises a load platform for receiving a cargo thereon and which is provided with a lifting device for adjusting the load platform to a cargo-receiving or releasing low position and a cargo-transporting high position, wherein the lifting device is coupled to an operating arm extending from the frame, which operating arm enables a user to manoeuvre with the pallet truck and to adjust the load platform between the low and high position with the lifting device, wherein the frame is provided with at least one force sensor for registering and generating as electronic output signal, signaling a load on the load platform, wherein the at least one force sensor is coupled to electronic processing means for receiving and processing the output signal from the at least one force sensor, and wherein display means are provided for generating to the user a visual indication of a weight of the load calculated by the processing means from the output signal of the at least one force sensor, wherein at least a part of the processing means is accommodated in a first housing that is arranged concealed inside the frame protected against impact, wherein the display means are provided in a second housing that is arranged spatially separated from the first housing, on or close to a handle of the operating arm, wherein a first connection is provided between the at least one force sensor and said at least part of the processing means over which the output signal is transmitted, and wherein a second connection is provided between the first housing and the second housing over which the output signal is transmitted, optionally in at least partially processed form, wherein said first connection is a wired cable connection, wherein the second connection is a wireless telecommunication connection and wherein telecommunication means are provided for establishing and maintaining said wireless second connection between the first housing and the second housing.

2. Pallet truck as claimed in claim 1, characterized in that at least one of the first housing and the second housing comprises an electric power supply in the form of a rechargeable battery and that the frame is provided with conversion means for extracting kinetic energy from the frame and recovering electrical energy therefrom which is supplied to the rechargeable battery.

3. Pallet truck as claimed in claim 2, characterized in that the kinetic energy is extracted from a manipulation of the operating arm.

4. Pallet truck as claimed in claim 2, characterized in that the kinetic energy is extracted from a rolling movement of the frame.

5. Pallet truck as claimed in claim 1, characterized in that at least one of the first housing and the second housing comprises an electric power supply in the form of a rechargeable battery, and that conversion means are provided here for recovering electrical energy from ambient light which is supplied to the rechargeable battery.

6. Pallet truck as claimed in claim 1, characterized in that the telecommunication means comprise a transmitter-receiver assembly on the basis of a standard protocol for wireless data transfer.

7. Pallet truck as claimed in claim 1, characterized in that the load platform comprises a lift fork with a set of lifting tines, wherein at least one force sensor is accommodated between the frame and each of the lifting tines of the lift fork for the purpose of registering and generating as electronic output signal a loading of the associated lifting tine.

8. Pallet truck as claimed in claim 6, wherein the telecommunication means comprise a transmitter-receiver assembly on the basis of Bluetooth.

\* \* \* \* \*